US011037550B2

(12) United States Patent
Subramanian et al.

(10) Patent No.: US 11,037,550 B2
(45) Date of Patent: Jun. 15, 2021

(54) AUDIO-BASED LINK GENERATION

(71) Applicant: DISH Network L.L.C., Englewood, CO (US)

(72) Inventors: Prakash Subramanian, Littleton, CO (US); Nicholas Brandon Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 58 days.

(21) Appl. No.: 16/206,347

(22) Filed: Nov. 30, 2018

(65) Prior Publication Data

US 2020/0175965 A1 Jun. 4, 2020

(51) Int. Cl.
| | | |
|---|---|---|
| *G10L 15/07* | (2013.01) | |
| *G10L 15/32* | (2013.01) | |
| *G10L 15/16* | (2006.01) | |
| *G10L 15/06* | (2013.01) | |

(52) U.S. Cl.
CPC ............ *G10L 15/07* (2013.01); *G10L 15/063* (2013.01); *G10L 15/16* (2013.01); *G10L 15/32* (2013.01); *G10L 2015/0636* (2013.01)

(58) Field of Classification Search
CPC ................................ G10L 15/22; G10L 25/60
See application file for complete search history.

(56) References Cited

U.S. PATENT DOCUMENTS

| | | |
|---|---|---|
| 4,870,579 A | 9/1989 | Hey |
| 6,321,221 B1 | 11/2001 | Bieganski |
| 6,774,926 B1 | 8/2004 | Ellis et al. |
| 6,978,470 B2 | 12/2005 | Swix |
| 7,958,525 B2 | 6/2011 | Karaoguz et al. |
| 8,065,151 B1 * | 11/2011 | Bangalore ............. G10L 15/193 704/270 |
| 8,180,804 B1 | 5/2012 | Narayanan |
| 8,195,460 B2 | 6/2012 | Degani et al. |
| 8,327,395 B2 | 12/2012 | Lee et al. |
| 8,332,883 B2 | 12/2012 | Lee et al. |
| 8,561,095 B2 | 10/2013 | Dimitrova et al. |
| 8,589,968 B2 | 11/2013 | Alberth et al. |
| 8,654,952 B2 | 2/2014 | Wang et al. |
| 8,682,666 B2 | 3/2014 | Degani et al. |
| 8,768,744 B2 | 7/2014 | Narasimhan et al. |
| 8,782,681 B2 | 7/2014 | Lee et al. |
| 8,849,199 B2 | 9/2014 | Shrum, Jr. et al. |
| 8,849,649 B2 | 9/2014 | Duong-van |

(Continued)

FOREIGN PATENT DOCUMENTS

CN 104038836 A 9/2014

OTHER PUBLICATIONS

Sato et al., "Recommender System by Grasping Individual Preference and Influence from other users," 2013 IEEE/ACM International Conference on Advances in Social Networks Analysis and Mining (ASONAM'13), ACM, 2013, pp. 1345-1351.

(Continued)

*Primary Examiner* — Jakieda R Jackson
(74) *Attorney, Agent, or Firm* — Kilpatrick Townsend & Stockton LLP

(57) ABSTRACT

First and second speech data can be received from respective first and second devices. The first and second speech data can be determined to be from a same dialog. A link can be generated based on the dialog.

19 Claims, 4 Drawing Sheets

(56) References Cited

U.S. PATENT DOCUMENTS

| | | | |
|---|---|---|---|
| 8,973,022 B2 | 3/2015 | Lee et al. | |
| 9,009,024 B2 | 4/2015 | Zhang et al. | |
| 9,026,476 B2 | 5/2015 | Bist | |
| 9,244,894 B1* | 1/2016 | Dale | G06F 40/279 |
| 9,306,989 B1 | 4/2016 | Jayaram | |
| 9,338,493 B2 | 5/2016 | Van Os et al. | |
| 9,454,519 B1 | 9/2016 | Keysers et al. | |
| 9,679,570 B1 | 6/2017 | Edara | |
| 9,712,587 B1 | 7/2017 | Alfishawi et al. | |
| 9,727,539 B2* | 8/2017 | Warren | G06F 16/951 |
| 9,832,619 B2 | 11/2017 | Cho | |
| 10,122,856 B1* | 11/2018 | Langley | H04M 3/5133 |
| 2003/0063222 A1 | 4/2003 | Creed et al. | |
| 2004/0001616 A1 | 1/2004 | Gutta | |
| 2005/0132401 A1 | 6/2005 | Boccon-Gibod et al. | |
| 2005/0144064 A1 | 6/2005 | Calabria et al. | |
| 2006/0159109 A1 | 7/2006 | Lamkin | |
| 2007/0288987 A1 | 12/2007 | Kim et al. | |
| 2008/0027605 A1* | 1/2008 | Oesterling | G06Q 10/107 |
| | | | 701/31.4 |
| 2008/0046917 A1 | 2/2008 | de Heer | |
| 2008/0114737 A1* | 5/2008 | Neely | G06Q 10/107 |
| 2009/0030792 A1 | 1/2009 | Khivesara et al. | |
| 2009/0144075 A1 | 6/2009 | Flinn et al. | |
| 2009/0234727 A1 | 9/2009 | Petty | |
| 2010/0114937 A1 | 5/2010 | Hawthorne et al. | |
| 2010/0138416 A1 | 6/2010 | Bellotti | |
| 2010/0324992 A1 | 12/2010 | Birch | |
| 2011/0238495 A1 | 9/2011 | Kang | |
| 2011/0282947 A1 | 11/2011 | Dodson | |
| 2011/0320471 A1 | 12/2011 | Hiroi et al. | |
| 2012/0005224 A1 | 1/2012 | Ahrens | |
| 2012/0086568 A1* | 4/2012 | Scott | G08B 13/00 |
| | | | 340/501 |
| 2012/0096025 A1* | 4/2012 | Li | G06Q 10/10 |
| | | | 707/769 |
| 2012/0233155 A1* | 9/2012 | Gallmeier | G06F 16/685 |
| | | | 707/722 |
| 2012/0265819 A1* | 10/2012 | McGann | G06Q 10/00 |
| | | | 709/204 |
| 2012/0266191 A1 | 10/2012 | Abrahamsson et al. | |
| 2012/0311618 A1 | 12/2012 | Blaxland | |
| 2013/0145385 A1 | 6/2013 | Aghajanyan et al. | |
| 2013/0158984 A1* | 6/2013 | Myslinski | G06F 16/951 |
| | | | 704/9 |
| 2013/0297638 A1 | 11/2013 | Hein | |
| 2013/0347029 A1* | 12/2013 | Tang | H04N 21/812 |
| | | | 725/32 |
| 2014/0036022 A1 | 2/2014 | Croen et al. | |
| 2014/0067953 A1 | 3/2014 | Weinstein | |
| 2014/0088952 A1 | 3/2014 | Fife et al. | |
| 2014/0089801 A1 | 3/2014 | Agrawal | |
| 2014/0090864 A1* | 4/2014 | Paulson | B32B 17/06 |
| | | | 174/50 |
| 2014/0108142 A1 | 4/2014 | Toebes et al. | |
| 2014/0173653 A1 | 6/2014 | Waibel et al. | |
| 2014/0188997 A1 | 7/2014 | Schneiderman et al. | |
| 2014/0195328 A1 | 7/2014 | Ferens et al. | |
| 2014/0201125 A1 | 7/2014 | Moeinifar et al. | |
| 2014/0244636 A1 | 8/2014 | Mickelsen | |
| 2014/0270114 A1* | 9/2014 | Kolbegger | H04M 3/5166 |
| | | | 379/88.08 |
| 2014/0279751 A1 | 9/2014 | Ram et al. | |
| 2014/0337427 A1 | 11/2014 | Hamada et al. | |
| 2014/0344039 A1 | 11/2014 | Kowalczyk | |
| 2014/0365349 A1 | 12/2014 | Kennon | |
| 2014/0379825 A1* | 12/2014 | Speier | H04L 51/24 |
| | | | 709/206 |
| 2015/0020086 A1 | 1/2015 | Chen | |
| 2015/0026706 A1 | 1/2015 | Leamon | |
| 2015/0039549 A1 | 2/2015 | Aufmann | |
| 2015/0112918 A1 | 4/2015 | Zheng et al. | |
| 2015/0234996 A1* | 8/2015 | Wartena | G16H 40/63 |
| | | | 434/236 |
| 2015/0244657 A1* | 8/2015 | Ghafourifar | G06F 16/951 |
| | | | 709/206 |
| 2015/0294221 A1 | 10/2015 | Gutierrez et al. | |
| 2016/0034970 A1 | 2/2016 | Musil | |
| 2016/0048667 A1* | 2/2016 | Kao | G06F 21/32 |
| | | | 726/19 |
| 2016/0077794 A1* | 3/2016 | Kim | G10L 15/20 |
| | | | 704/275 |
| 2016/0147767 A1 | 5/2016 | Manning et al. | |
| 2016/0155443 A1* | 6/2016 | Khan | G10L 15/22 |
| | | | 704/275 |
| 2016/0217159 A1* | 7/2016 | Dahan | G06F 16/256 |
| 2016/0239547 A1 | 8/2016 | Lim et al. | |
| 2016/0259797 A1 | 9/2016 | Lewis et al. | |
| 2016/0277787 A1 | 9/2016 | Kobayashi et al. | |
| 2016/0314782 A1* | 10/2016 | Klimanis | G10L 15/065 |
| 2017/0048184 A1 | 2/2017 | Lewis et al. | |
| 2017/0090864 A1* | 3/2017 | Jorgovanovic | G10L 21/0332 |
| 2017/0133011 A1* | 5/2017 | Chen | H04L 12/4625 |
| 2017/0134803 A1 | 5/2017 | Shaw | |
| 2017/0169726 A1 | 6/2017 | Aguirre | |
| 2017/0322947 A1 | 11/2017 | Subramanian | |
| 2017/0332168 A1* | 11/2017 | Moghimi | G10L 21/0208 |
| 2017/0339467 A1 | 11/2017 | Patel et al. | |
| 2017/0366861 A1 | 12/2017 | Chung | |
| 2018/0040019 A1 | 2/2018 | Gavlovski et al. | |
| 2019/0034976 A1* | 1/2019 | Hamedi | G06Q 30/0244 |
| 2019/0068671 A1* | 2/2019 | Mehta | H04L 65/601 |
| 2019/0074008 A1* | 3/2019 | Beckhardt | G10L 15/22 |
| 2019/0180770 A1* | 6/2019 | Kothari | G06F 3/167 |
| 2020/0065425 A1* | 2/2020 | Menguy | G06Q 30/00 |
| 2020/0135192 A1* | 4/2020 | Mukherjee | G10L 15/22 |

OTHER PUBLICATIONS

Kompan et al., "Context-based Satisfaction Modelling for Personalized Recommendations," 8th International Workshop on Semantic and Social Media Adaptation and Personalization, IEEE, 2013, pp. 33-38.

Bublitz et al., "Using Statistical Data for Context Sensitive Pervasive Advertising," IEEE, 2014, pp. 41-44.

Hong et al., "A Comparative Study of Video Recommender Systems in Big Data Era," IEEE, 2016, pp. 125-127.

Mao et al., "Multirelational Social Recommendations via Multigraph Ranking," IEEE, 2016, pp. 1-13.

* cited by examiner

AUDIO-BASED LINK GENERATION

BACKGROUND

Electronic computing devices such as personal digital assistants, smartphones, and the like can include microphones as well as storage media and processors programmed to detect and or store sounds, including human speech. For example a device can be include programming to receive various input, e.g., commands to an application, content for a message, etc., as audio input. However, improved architectures are needed to allow devices to proactively receive and process audio input.

DRAWINGS

DESCRIPTION

Figure 1:
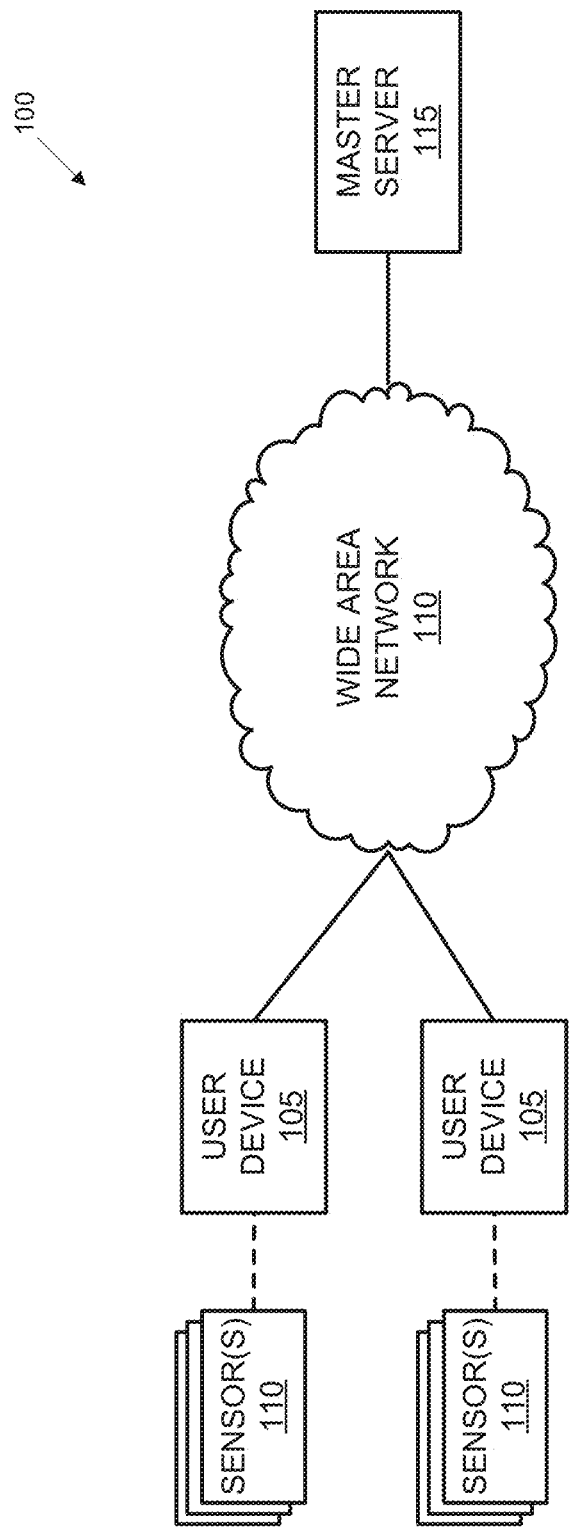
FIG. 1 is a diagram of an exemplary system for audio-based link generation.

Exemplary System
Introduction

A system 100 includes a plurality of user devices 105, each including one or more sensors 110, in communication, typically via a wide area network 110, with a master server 115. The server can be programmed to receive first and second speech data from respective first and second devices; determine that the first and second speech data are from a same dialog; and generate a link, i.e., a hyperlink, based on the dialog. Speech recognition, including recognizing speech captured in a mobile device, is known, but problems arise in identifying as related and analyzing together speech from two or more devices. Further, existing architectures are lacking with respect to, based on analyzing together speech from two or more devices, providing output such as a link or the like based on the speech from the two or more devices. The presently disclosed system 100 addresses such shortcomings.

A system comprises a computer comprising a processor and a memory, the memory storing instructions executable by the processor such that the computer is programmed to receive first and second speech data from respective first and second devices; determine that the first and second speech data are from a same dialog; and generate a link based on the dialog. The first and second devices can be included in a plurality of three or more devices, the instructions further including instructions to identify the first and second devices as included in the plurality of devices. The instructions can further comprise instructions to determine whether each of the first and second devices are authenticated to provide speech data. The first and second speech data can be substantially mutually exclusive of one another. The instructions to determine that the first and second speech data are from the same dialog can include instructions to compare a time and a location of the first speech data and a time and a location of the second speech data. The instructions to determine that the first and second speech data are from the same dialog can include instructions to identify a stored keyword in each of the first speech data and the second speech data. The instructions to generate the link can be based on, in addition to the dialog, a biometric datum stored by the first user device or the second user device during the dialog. The to generate the link can be based on, in addition to the dialog, a prior link accessed by the first user device or the second user device after a specified amount of time has passed from generation of the prior link. The instructions can include instructions to send the link to the first user device or the second user device. The instructions can further comprise instructions to determine a correlation index that measures a quality of conversation between the first and second speech data; wherein the instructions to generate the link based on the dialog include instructions to generate the link based on the correlation index.

A method can comprise receiving first and second speech data from respective first and second devices; determining that the first and second speech data are from a same dialog; and generating a link based on the dialog. The first and second devices can be included in a plurality of three or more devices, and the method can further comprise identifying the first and second devices as included in the plurality of devices. The method can further comprise determining whether each of the first and second devices are authenticated to provide speech data. The first and second speech data can be substantially mutually exclusive of one another. Determining that the first and second speech data are from the same dialog can include comparing a time and a location of the first speech data and a time and a location of the second speech data. Determining that the first and second speech data are from the same dialog can include identifying a stored keyword in each of the first speech data and the second speech data. The method can further comprise generating the link based on, in addition to the dialog, a biometric datum stored by the first user device or the second user device during the dialog. The method can further comprise generating the link based on, in addition to the dialog, a prior link accessed by the first user device or the second user device after a specified amount of time has passed from generation of the prior link. The method can further comprise sending the link to the first user device or the second user device. The method can further comprise determining a correlation index that measures a quality of conversation between the first and second speech data; wherein the generating the link based on the dialog includes generating the link based on the correlation index.

User Device

A user device 105 may be a computing device such as a mobile telephone (e.g., a smart phone running the Android or iOS operating systems), a tablet, smart wearable (smart watch, fitness band, etc.), or other computing device such as a laptop or desktop computer, a home automation device or in-home digital assistant, etc. The user device 105 may be able to communicate via the wide area network 115, e.g., with other devices 105, the server 115, etc. The user device 105 includes one or more processors and one or more memories as well as one or more sensors 110, including at least an audio sensor, i.e., microphone. Device 105 sensors 110 can be a variety of devices, e.g., one or more of a heart rate sensor, a galvanic skin response sensor, a camera, a microphone, an accelerometer, a gyroscope, a location (e.g., global positioning system) sensor, etc.

Data from sensors 110, in addition to audio data recorded via a microphone sensor as discussed herein, can be provided to the device 105 processor to identify one or more users. For example, voice recognition techniques could be used to identify a device 105 primary user or owner and possible also other users in audio data captured by a device 105 microphone sensor 110. Accordingly, a user device 105 can identify a voice of a device 105 owner or user, as well as assign identifiers to one or more other identified distinct voices in audio input. The device 105 can include, in addition to the audio sensor 110, other sensors 110 for alternative or additional biometric identification, e.g., cameras and other optical sensors for face recognition, retina scans, fingerprint scans, as well as heart rate sensors, heat sensors, etc. The device 105 can recognize speech, e.g., according to conventional speech recognition techniques, to identify words in the received audio input. When the device 105 identifies a trigger word in received audio input, the device 105 may provide some, though typically not all, audio input capturing the identified voices to the server 115.

The user device 105 can store one or more trigger words (the term "trigger word" herein includes phrases of one or more words). A trigger word is a word or phrase that can be stored in a memory of the device 105. For example, the device 105 can receive a trigger word via user input, via download from a server 115, etc. By programming the device 105 to recognize and transmit audio data on receipt of trigger words, the system 100 among other things addresses the problem that the device 105 could otherwise consume unnecessary network resources and bandwidth to transmit audio data to the server 115. Moreover, in addition to avoiding inefficient use of network resources, processing audio data on the server 115 without a trigger word would consume unnecessary processor cycles on the server 115.

The device 105 can be programmed to, upon identifying a trigger word in audio input, provide some, but, as just mentioned, typically not all, of the audio input to the server 115. For example, the device 105 can be programmed to provide only audio of a user identified as a device owner or primary user, i.e., a user who has been authenticated by the device, e.g., via voice recognition and/or other biometric identification. Audio of one or more second users who are unidentified by the device 105 (or are identified only as unknown or unidentified users) can be omitted from audio data transmitted to the server 115, thus further conserving bandwidth. A partial recording of a dialog between a first user of a first device 105 and a second user can thereby be provided to the server 115 along with metadata to provide the server 115 with context of the dialog.

The metadata can include a location of the first device 105, e.g., according to conventional geo-coordinates. The metadata can further include one or more timestamps (e.g., including a date and a time down to the second) for each of a plurality of respective segments of an audio recording. Yet further, each timestamp can have a specified location, which can be important for mobile devices 105. That is, if a user device 105 is moving as a user has a dialog, e.g., the user is walking, in a vehicle, etc., each timestamp may have a different location. In any event, metadata including timestamp(s) and location(s) included in audio data provided from a first user device 105 to a server 115 can be used by the server 115, as further discussed below, to associate the audio data from the first user device 105 with second audio data from a second user device 105.

Network

The wide area network (or WAN) 110 represents one or more mechanisms, typically including the Internet, for sending and receiving data between user devices 105, a server 115, etc. The WAN 110 is distinguished from a local area network (or LAN) in that the WAN 110 can encompass any distance on the surface of the earth, whereas a LAN is limited to a specified geographic area, typically a single building, complex, or campus. The network 110 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). A LAN may be included in a WAN 110 and may include wireless and/or wired mechanisms, such as Wifi®, Ethernet, etc., but typically does not by itself include mechanisms designed for long-range communications, such as cellular.

Remote Server

A remote server 115 can communicate with one or more devices 105 via various mechanisms including the wide area network 110. The server can include one or more computing devices, i.e., including a processor and a memory storing instructions executable by the processor.

The server 115 can receive audio data from two or more devices 105, and can determine that audio data from respective devices 105 is of a same dialog. The server 115 can compare metadata from first audio data (from a first device 105) and second audio data (from a second device 105) to determine whether the first and second audio data are from a same dialog. For example, if the first and second metadata could specify a same location, e.g., within a specified distance such as three meters, and/or same locations at respective same timestamps (e.g., within one second of each other), and include same starting and ending timestamps and/or starting or ending timestamps that indicate a significant overlap (e.g., "significant" in this context could mean that 75 percent of each of the respective audio dialogs are within a same period of time), then the server 115 could determine that the first and second audio data are of or from a same dialog.

Stitched Audio File

Further, the server 115 typically receives, from a first device 105, a first set of audio data that includes only audio segments, each specified by a timestamp or timestamps (e.g., a starting timestamp and an ending timestamp of a segment) and possibly also a location, a voice recognized as belonging to a user identified and/or authenticated by the first device 105. For example, each segment can be a user's portion of a dialog. Moreover, the server 115 typically receives from a second device 105 a second set of audio data that, even when of a same dialog as captured by the audio data from the first device 105, includes only audio segments (including the afore-discussed metadata) belonging to a second user identified and/or authenticated by the second device 105. Thus, the server 115 could receive a first set of audio data from a first device 105 that includes a plurality of segments, each representing a snippet or portion of a first user's dialog. As an example, respective segments in a first set of audio data could include speech such as "I'm fine, and you," "yes, I saw that, it was great," "right, but the ending was a little lame," "that's one of the best books I ever read," "they have the best lasagna," etc. To continue this example, respective segments in a second set of audio data from a second user device 105 could include speech such as "how are you doing," "have you seen the new Star Wars movie," "I thought the ending was silly," "have you ever read Jeeves and the feudal spirit," "I went to Antonio's last night," etc.

The server 115 can accordingly be programmed to use respective timestamps and/or locations in respective first and second metadata to generate a third set of audio data, i.e., a new or "stitched" set of audio data, e.g., an audio file that can be stored in a memory of the server 115, that includes a complete dialog, or at least one or more segments thereof, of which the first and second audio data each include only different portions, i.e., portions including speech of the respective first and second users. Thus, the phrase "stitched audio file" herein means a set of audio data assembled from two or more other, initial, sets of audio data, e.g., received in the server 115 from respective first and second user devices 105. Table 1 below shows as example of how a stitched audio file could be assembled or generated by the server 115, e.g., how a concatenation could be provided of audio segments from first and second initial audio files, each having respective starting and ending timestamps.

TABLE 1

| First initial audio file | Second initial audio file | Start timestamp | End timestamp |
|---|---|---|---|
| Segment1A | | 11:40:05 | 11:40:10 |
| | Segment2A | 11:40:09 | 11:40:23 |
| Segment1B | | 11:40:25 | 11:40:31 |
| | Segment2B | 11:40:30 | 11:40:47 |
| Segment1C | | 11:40:50 | 11:40:59 |

Thus, in the example of Table 1, a resulting stitched audio file could include, in the order given, Segment1A+Segment2A+Segment1 B+Segment2B+Segment1C. Note that the number of segments provided in Table 1 is limited for purposes of example; a stitched audio file could include many more segments and/or segments from more than two initial audio files. Further, note that the respective starting and ending timestamps that are associated with each other to determine an order of concatenating segments need not match exactly (e.g., the end timestamp 11:40:10 of Segment1A and the starting timestamp 11:40:09 of Segment1B differ by one second), but additionally can be deemed to "match" for purposes of concatenating the respective segments if the timestamps are within a specified range of each other, e.g., three seconds. Further, alternatively or in addition to segment start and end timestamps based on an actual clock time, each initial audio file could include, for the entire respective file, a start timestamp and/or end timestamp, whereupon segment start and end timestamps could be determined relative to the start and/or end timestamp for the entire respective initial audio file. That is, to take just one example, a start timestamp for a first initial audio file could be 11:40:05, in which case, continuing the example of Table 1, a Segment1B could have a start timestamp of 15, i.e., 15 seconds after the start timestamp for the file.

Correlation Index

The server 115 can further be programmed to generate a correlation index CI (sometimes referred to as a conversation score) that provides a measure of whether the content of a dialog or conversation, i.e., based on analyzing the stitched set of audio data generated by the server 115 from the respective audio data from the first and second devices 105, is likely to influence future user behavior. A correlation index can be generated based on inputs that can include the stitched set of audio data, user input, and/or profile data about users. For example, the server 115 could generate the correlation index based on user input. Further for example, U.S. Patent Application Pub. Nos. US 2018/0183885A1, US 2018/0184157A1, and US 2018/0183886A1, the contents of each of which are fully incorporated herein by reference in their entirety, disclose generating a correlation index (referred to there as a conversation score), e.g., according to a rules-based evaluation. Yet further alternatively or additionally, machine learning techniques could be used to determine a correlation index between users by training a machine learning program to accept as input a stitched audio file and/or other input such as a user identity, a rating of user interest or affinity for various categories of items (e.g., one a scale of one to ten, how well does the user like a category of movie, a type of car, a type of shoes, a type of food, etc.), a number of prior links generated between users in the stitched audio file, etc.

Correlation Index Based on User Input

In an approach including user input to determine a correlation index CI, a user device 105 could be programmed, upon determining to transmit audio data of a dialog to the server 115, to further request user input to rate the dialog with respect to a second voice detected in the dialog. For example, a first user of a device 105 could be asked to rate, on a scale of one to ten, a second user with respect to one or more factors that provide indicia of whether the first or the second user would benefit from a link generated based on the dialog. Such factors could include items such as "quality of dialog," "quality of recommendations," "similarity of interests," etc. The server 115 could then receive such input and determine a correlation index CI, e.g., on a scale of 1 to ten, by averaging the user input for each of the factors.

Correlation Index Based on Rule(s)

In an approach including a rules-based determination of the correlation index CI, the server 115 can be programmed to evaluate a set of audio data generated as described above that includes a dialog between a first user (of a first device 105) and a second user (of a second device 105). The dialog may be evaluated based on one or more criteria that are represented with quantitative factors and then subjected to statistical evaluation. e.g., averaging, weighted averaging, etc., e.g., as described above, to determine a correlation index CI. The correlation index may be an indication of whether the users participating in the dialog enjoyed the dialog, and whether the dialog had an impact on future user behavior. The server 115 may determine the correlation index CI by determining and subsequently combining, e.g., according to a statistical or mathematical operation such as averaging, one or more partial correlation indexes.

In some examples, a rule could specify to set a correlation index to zero regardless of any other output for the correlation index CI that would be generated (even if user input and/or machine learning are used). For example, if a stitched audio file contains obscenity, epithets, or other specified negative trigger words, then CI could be set to zero. Alternatively or additionally, the server 115 could store a rule for a first device 105 that a correlation index for a specified second device 105 should always be set to zero.

Otherwise, a first partial correlation index for evaluating the dialog may be based on indicators of a quality of the interaction between first and second users. Indicators of an interaction quality may include a length of the dialog, positive content such as language indicating that one of the users really enjoyed speaking with the other user or the users, the first and second users planning to meet each other, and voice quality data indicating that the first and second users are happy, language indicating a lot of agreement between the first and second users, etc.

One or more of these indicators may be evaluated, and assigned a numerical value. As a first indicator, the server 115 may maintain a table or the like of lengths of a dialog (e.g., measured in minutes) and assign a value to different lengths. The server 115 may then measure a length of the dialog (e.g., in minutes) in the stitched audio file and assign a value based on the table. A length of the dialog of 15 minutes or more may be assigned a value of ten. A dialog from 12 to 15 minutes may be assigned a value of nine. A dialog with a length of ten to 12 minutes may be assigned a value of eight, etc.

As a second indicator, the language of the dialog may be evaluated and assigned a value for a level of positive interaction. The values may be in a range from zero to ten, for example. The server 115 may be programmed to search the language of the dialog in the stitched file for positive comments from a first user toward a second user, and to assign values to the comments. The server 115 may, for example, maintain a table of expressions, and assign each expression a value. Expressions like "thanks so much for calling," "I'm so happy to hear from you," "great talking to you," "that's interesting," "tell me more," etc. may be assigned a value such as nine or ten. Expressions such as "what's up," "I am busy right now," "I didn't like that," "that was boring," "I've seen better," etc. may be given a low value such as two or three.

As a third indicator, the server 115 may be programmed to evaluate a voice quality or characteristic (i.e., a physical attribute measured in audio data representing a voice) of each of the first and second users during the dialog in the stitched file. Using conventional voice analysis, the server 115 may evaluate voice qualities such as speed, inflection, volume, pitch, tone, etc., of each of the first and second users. Based on these various qualities of the speech, the server 115 may determine, for example, that the user was excited, happy, disappointed, etc., and assign the an emotional score to the user's speech. The server 115 may use tables that assign emotional scores based on the determined emotional state of the user. Positive emotions such as happy may have a high score of nine or ten. Negative emotions such as disappointment, boredom, etc., may be given lower scores such as one or two.

The different indicators of a quality of the interaction may be combined to form a first partial correlation index.

A second partial correlation index may be based on a degree to which parameters such as an affinity between the first and second user changes, keywords for the first or the second user, keywords for the media content, etc. are updated. The server 115 may update affinities between users, keywords associated with a user, and keywords associated with media content items, based on user data received from user-user communications, e.g., from a stitched audio file.

The server 115 may assign a value between zero and ten to the amount of change in an affinity value between the first user and the second user. The server 115 may assign, for example, a numerical value of one for a 0.1 change in the affinity value, two for a 0.2 change in the affinity value, up to a value of ten for a one point change or more in the affinity value.

Further, the server 115 may assign a value between zero and ten to the changes to keywords associated with the first user, second user or media content item. For example, a change in a keyword associated with one of the first user (e.g., the list of top three keywords changes), second user and media content item may be assigned a value of five, a change in a keyword to two of the first user, second user and media content item may be assigned an eight, and a change in keyword for three of the first user, second user and media content item may be assigned a ten.

The server 115 may be programmed to determine the second partial correlation index by combining the score associated with the change in affinity between the first and second users and the score associated with the change in keywords. For example, the server 115 may be programmed to take an average of the scores.

Based on the first and second partial correlation indexes, the server 115 may be programmed to determine an overall correlation index CI, by for example averaging the first and second partial scores.

Additional factors or rules may be considered in determining a correlation index CI. Further, the correlation index is not static, but may change over time. For example, usage of media content by one of the first user and second user and/or behavior related to the relationship of the first and second user subsequent to the dialog may be considered, and the correlation index updated. As described with regard to the process 200, the server 115 may collect user data periodically or even continuously or almost continuously. The server 115 may increase the correlation index based on data indicating that the second user viewed the media content item following the dialog. Similarly, the server 115 may increase the correlation index based on data indicating that the first user and second user had increased interactions, such as dialogs, meetings with each other, etc., subsequent to the dialog.

Correlation Index Based on Machine Learning

Figure 2:
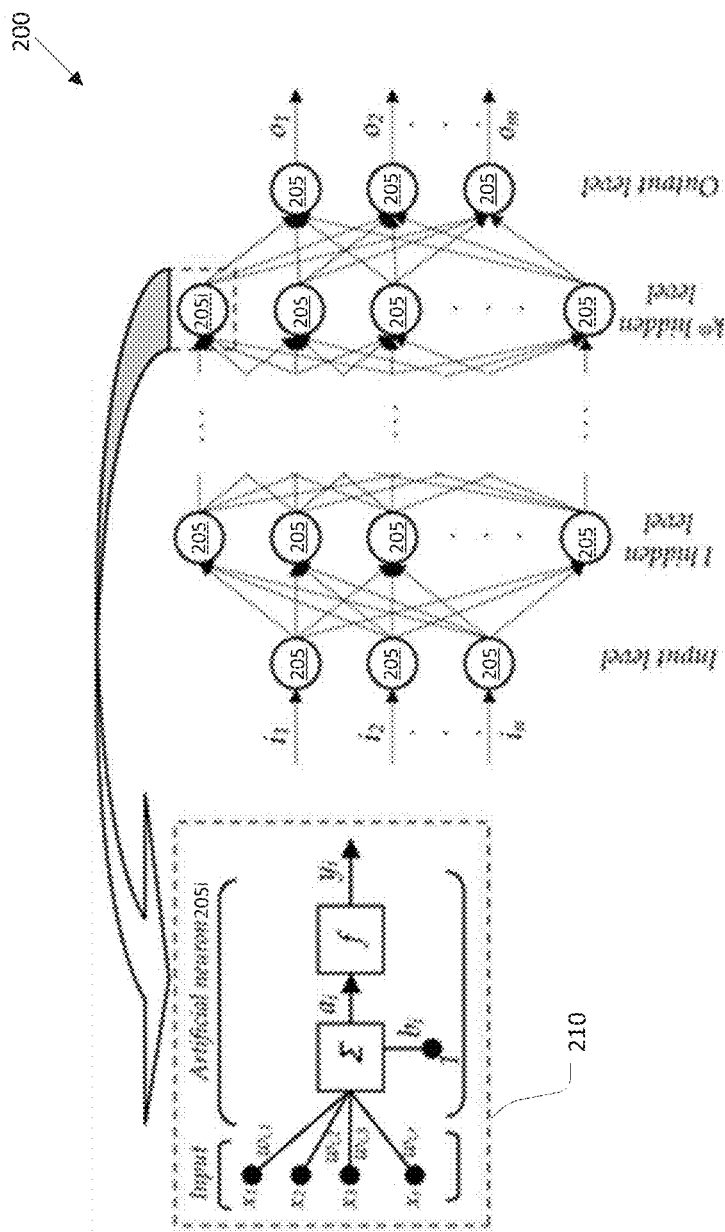
FIG. 2 illustrates an example Deep Neural Network (DNN).

In an approach including a machine learning-based determination of the correlation index, a neural network, such as a deep neural network 200 as illustrated in FIG. 2, could be trained to output the correlation index based on input of a stitched audio file. For example, the server 115 may be programmed based on a neural network such as a Deep Neural Network (DNN) to determine a correlation index CI in the received audio data. FIG. 2 is a diagram of an example deep neural network (DNN) 200. The DNN 200 can be a software program that can be loaded in memory and executed by a processor included in server 115, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. The nodes 205 are sometimes referred to as artificial neurons 205, because they are designed to emulate biological, e.g., human, neurons. A neuron block 210 illustrates inputs to and processing in an example artificial neuron 205i. A set of inputs $x_1 \ldots x_r$ to each neuron 205 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 205i output $y_i$. The activation function $f$ can be a variety of suitable functions, typically selected based on empirical analysis.

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200. Training may be an iterative operation. In one example, the computer 180 may be programmed to perform an iterative training until an error, i.e., a difference between an expected output (based on training data) relative to an output from the trained DNN 200, is less than a specified threshold, e.g., 10%.

The DNN 200 can be trained to accept as input a stitched audio file and/or other input such as a user identity, a rating of user interest or affinity for various categories of items (e.g., one a scale of one to ten, how well does the user like a category of movie, a type of car, a type of shoes, a type of food, etc.), a number of prior links generated between users in the stitched audio file, etc., and to output a predicted correlation index CI. For example, a stitched audio file may be provided as input to a DNN 200, and the DNN 200 may output the correlation index CI. The DNN 200 can be trained with ground truth data, i.e., data about a real-world or baseline condition or state, such as a stitched audio file including specified words and/or user speech attributes, such as a specified tone, pitch, volume, speed of speech, etc. Weights w can be initialized by using a Gaussian distribution, for example, and a bias b for each node 205 can be set to zero. Training the DNN 200 can including updating weights and biases via conventional techniques such as back-propagation with optimizations. Data can be labeled for training the DNN 200, i.e., tags identifying a correlation index CI for input ground truth data.

Once the DNN 200 is trained, the server 115 can input a stitched audio file and/or data therefrom, e.g., a tone, pitch, volume, and/or words of detected speed, and can output a predicted correlation index CI.

Processes

Figure 3:
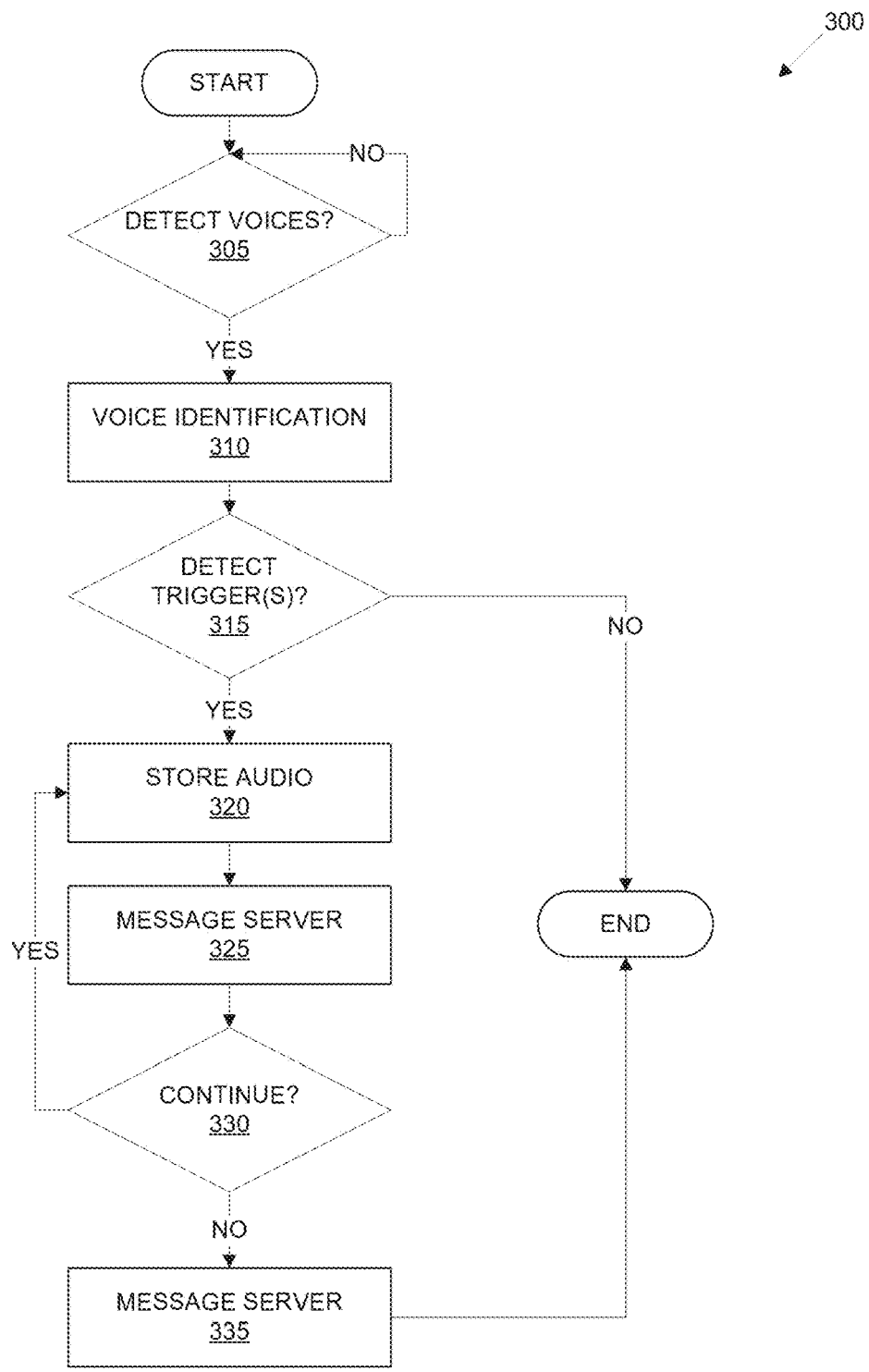
FIG. 3 illustrates an exemplary process for a user device to store and transmit audio data.

FIG. 3 illustrates an exemplary process 300 for a user device 105 to store and transmit audio data. For example, blocks of the process 300 could be carried out by a computer server or the like included in a user device 105.

The process 300 begins in a decision block 305, in which a user device 105 determines whether data received via an audio sensor 110 includes speech from more than one voice, e.g., according to conventional voice identification techniques.

Next, in a block 310, the user device 105, again, using conventional voice identification techniques and as discussed above, can execute programming to assign an identity to each of the two or more voices determined in the block 305. For example, voice identification techniques could be used to identify a first detected voice as a voice of an owner or primary user of the device 105. Moreover, where a user device 105 can have more than one owner or user, the user device 105 can be programmed to use, in addition or as an alternative to a detected voice, other biometric data from device 105 sensors 110, such as face recognition, a retina scan, a fingerprint scan, etc. Further, each additional distinctly identified voice could be assigned an identifier, e.g., other voice number one, other voice number two, etc.

Next, in a block 315, the user device 105 determines whether any trigger words are detected in speech recognized from the voices identified in the block 305, 310. The user device 105 can be programmed to analyze a specified duration of audio input including the two or more voices, e.g., thirty seconds, one minute, etc., before determining whether a trigger word is detected, and/or could be programmed to wait a specified time after last detecting a voice other than a voice of the primary user or owner of the device 105 before determining if a trigger word is detected. If a trigger word is detected, then the process 300 proceeds to a block 320. If not, the process 300 ends.

Next, in a block 320, the user device 105 stores audio received as described above. However, the device 105 is typically programmed to store only audio of a voice for which identification is stored in the device 105, e.g., of an owner of the device 105. Thus, the device 105 typically stores for transmission to the server 115 a plurality of segments of audio data, each providing the voice of a device 105 user but not providing audio data at times when the device 105 user's voice cannot be detected and/or substantially omitting voices of other users. Along with the audio, the device 105 can store one or more timestamps, e.g., a start time and an end time of an audio recording, as well as a timestamp of a start time of a first voice and a corresponding end time of the first voice, a second start time of a second voice and a corresponding second end time of the second voice, as well as additional similar timestamps as a dialogue continues. That is, each of the plurality of segments can be stored with starting and/or ending timestamps, in addition to start and/or end timestamps for an entire audio file, i.e., for the entire plurality of segments that can be provided to the server 115, e.g., as what is referred to above as an initial audio file.

Further, the device 105 could store other sensor 110 data, e.g., each timestamp could be provided along with a set of geo-coordinates determined according to a global positioning system (GPS) geo-location sensor 110 included in the device 105 and/or each set of audio data transmitted to the server 115 could be provided along with a set of geo-coordinates and/or other data specifying a location of the device 105 when the audio data was recorded. Yet further, the device 105 could store compass and/or accelerometer sensor 110 data indicating an orientation of the device 105 when audio data was recorded, e.g., a compass heading could indicate a direction in which a user was facing when data was recorded, and such data could be provided to the server 115 along with the audio data.

The device 105 could be programmed to store the audio for a specified period of time and then proceed to a block 325 from the block 320, and/or could be programmed to wait a specified period of time after a last detection of the voices in the audio, and then proceed to the block 325.

Next, in a block 325, the user device 105 transmits a message to the server 115, typically including the stored audio input.

Next, in a block 330, the user device 105 determines whether to continue storing audio, e.g., whether a timeout period between a last detected voice and a current time has expired. If yes, the process 300 proceeds to the block 320; otherwise, the process 300 proceeds to a block 335.

In the block 335, any audio stored resulting from the trigger word or words detected in the block 315 that has not yet been transmitted, e.g., as described above concerning the block 20, is transmitted to the server 115. The process 300 then ends.

Figure 4:
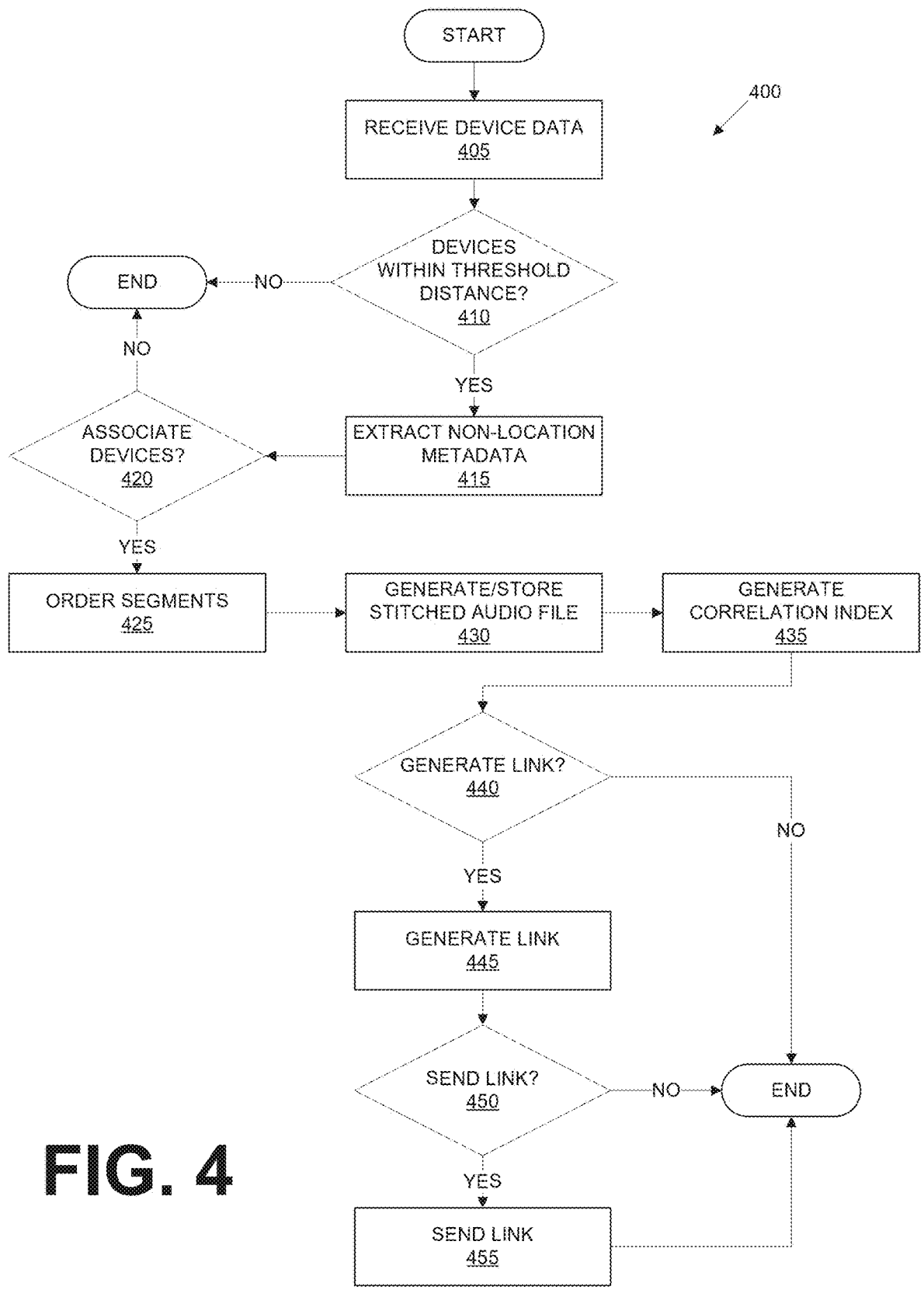
FIG. 4 illustrates an exemplary process for a server to perform audio-based link generation.

FIG. 4 illustrates an exemplary process 400 for a server 115 to dynamically generate links based on device 105 data. The process 400 can be executed by a processor of the server 115 according to program instructions stored in a memory of the server 115.

The process 400 can begin in a block 405, in which the server 115 receives data from a plurality of devices 115. After the data is received in the block 405, the process 400 proceeds to a block 410. For example, the server 115 could receive data from devices 115, and periodically, e.g., every five minutes, 10 minutes, 30 minutes, 60 minutes, etc., proceed to the block 410. The process 400 is described, for convenience, as including data from first and second devices 105, and stitching respective initial audio files from these first and second devices 105, but it should be understood that audio files from more than two devices 105 could be received in the block 405, and possibly combined or concatenated into a stitched audio file according to the process 400 (and similarly, Table 1 above could have included segments from three or more initial audio files).

In the block 410, the server 115, for a first set of audio data from a first device 105, and a second set of audio data from a second device 105, could determine whether the respective first and second devices 105 are within a threshold distance, e.g., two meters, five meters, etc., of one another. That is, if devices 105 are farther from each other than the threshold distance, then it may be concluded that users of the respective devices 105 have not had a dialog that can be analyzed for link generation as disclosed herein. Thus, if the devices are farther from each other than a threshold distance, the process 400 ends. Otherwise, the process 400 proceeds to a block 415 to analyze received audio data from respective devices 105, e.g., audio data from each of first and second devices 105 could be analyzed for a specified time, e.g., five minutes, after it is determined that the devices 105 were within the threshold distance of one other or for a time when the devices 105 were determined to be within the threshold distance of one another until a time when the devices 105 are determined to not be within the threshold distance of one another.

In the block 415, the server 115 can extract, from each of the initial sets of audio data received in the block 405, metadata in addition to the location metadata analyzed as described with respect to the block 410. The metadata extracted in the block 415 includes timestamps from each of the sets of audio data, e.g., respective start time timestamps indicating start times of the respective sets of audio data, and typically also end time timestamps indicating end times of the respective sets of audio data. Yet further, the metadata typically includes start and/or end timestamps for respective audio segments included in an initial set of audio data from a device 105.

In the block 420, the server 115 determines whether first and second audio data from respective first and second devices 105 can be associated, i.e., whether a stitched audio file can be generated. In one example, the server 115 determines whether start timestamps for respective initial audio files from devices 105 match, i.e., are within a predetermined threshold amount of time, e.g., five seconds, of one another. The server 115 in this example could further determine whether end timestamps for the respective audio files are within a predetermined threshold amount of time, e.g., five seconds of one another, and require the start and the end timestamps to match to determine to generate a stitched audio file. As an alternative, the server 115 could determine that first and second audio files should only be stitched together up to a time when first and second devices 105 remained within a specified distance, e.g., three meters, of one another; and end timestamp for each of the first and second audio files could be assigned based on a time when the first and second devices 105 were no longer within the specified distance. Yet further alternatively or additionally, the server 115 could determine a match of one or more segment start times in a first audio file with one or more segment end times in a second audio file and/or vice versa, to determine to generate a stitched audio file. If it is determined to associate devices, then a block 425 is executed following the block 420. Otherwise, the process 400 ends following the block 420.

In the block 425, the server 115 orders respective segments from the first and second initial audio files, e.g., as shown in Table 1 above.

Next, in a block 430, the server 115 generates a stitched audio file, e.g., by concatenating segments from the first and second initial audio files according to the order determined in the block 425. The stitched audio file may then be stored in a volatile memory and/or non-volatile storage of the server 115.

Next, in a block 435, the server 115 generates a correlation index CI from the stitched audio file, e.g., as described above.

Next, in a decision block 440, the server 115 determines whether to generate a link to be provided to the first device 105 and/or second device 105. In some implementations, the server 115 could determine to generate a link if first and second devices 105 have been associated with generation of a link on a prior occasion (or on more than one prior occasion) and/or if user input from the first device 105 has been received to generate a link based on any stitched audio file including the second device 105 and/or vice versa.

Alternatively or additionally, the server 115 can determine whether the correlation index CI exceeds a specified threshold. For example, CI could be provided on a scale of zero to 10, zero to 100, etc. The specified threshold could be selected based on an estimate of a correlation index at which it is determined to be likely that a first user will benefit from information such as a recommendation from a second user and/or vice versa. Such estimate could be obtained, for example, by surveying users after dialogs to determine if users would like to receive a link based on the dialog, and then obtaining a correlation index CI for the dialog, e.g., as described above. An average correlation index threshold at which users would like to receive links could thus be obtained. If a link is to be generated, then the process 400 proceeds to a block 445. Otherwise, the process 400 ends following the block 440.

Additionally, it is possible that the server 115 could cause a user device 105 to prompt a user to determine whether a link is to be generated. For example, in addition to determining that the correlation index CI exceeds a threshold, the server 115 could receive an indication from a first device 105 that a second device 105 included in a stitched conversation with the first device 105 is in proximity (e.g., within a specified distance or radius such as 5 meters, 10 meters, etc.) of the first device 105. That is, a devices 105 could provide their respective locations to the server 115, which could then determine when first and second devices 105 included in a stitched conversation, and with the correlation index CI exceeding a threshold, are within proximity of one another. The server 115 could then request that one or both of the devices 105 request user input as to whether to generate a link. Further, the server 115 could provide some or all of the stitched conversation to a device 105 (e.g., possibly limited to a portion of the stitched conversation from that device 105, e.g., to protect privacy of a second device 105 user). Yet further, the server 115 could be programmed to proceed with generating a link only upon a device 105 providing such confirmation.

In the block 445, the server 115 generates a link. In the context of the present disclosure and claims, a "link" means a set of digital data that specifies an association between first and second users, and typically further specifies an object, such as a media content item (e.g., a movie), a product, etc., that is a subject of the association. A user device 105 provides input to select the link, the server 115 can provide information about a second user and of the subject of the link (e.g., a movie that first and second users discussed and that is the subject or basis for forming the link).

A link is also, but not necessarily, provided with descriptive information to inform a user as to content that will be provided if the link is selected. Accordingly, to generate a link, the server 115 can store content to be provided when the link is selected, e.g., a web address or the like, graphical and/or textual content, and audio and/or visual media file possibly including some or all of a stitched audio file to remind a user of a dialog, etc. In one example, the server 115 can be programmed to generate a link by retrieving data associated with one or more words extracted, e.g., according to conventional speech recognition techniques, from the stitched audio file. For example, the server 115 could generate and/or store links to trailers for a movie, and could generate the link to include an address to retrieve a movie trailer upon determining that a name of the movie is included in the stitched audio file. The server 115 could similarly generate and/or store links to restaurant websites to be provided when a restaurant name is mentioned in a stitched audio file, etc.

Once a link is generated in the block 445, then next, in a block 450, the server 115 determines whether to send the link. For example, the server 115 could require input from at least one, or possibly from each, of the devices 105 providing audio data for the stitched audio file to confirm that the link should be sent. Alternatively or additionally, the server 115 could store a global consent from a device 105 and/or could store a consent from a first device 105 with respect to the second device 105. If it is determined to send the link, then the process 400 proceeds to a block 455. Otherwise, the process 400 ends.

Alternatively or additionally, the server 115 could determine to send a link to a user device 105 after an amount of time, e.g., three days, three weeks, etc., had passed to remind a user of the link.

In the block 455, the server 115 sends the link generated in the block 445. For example, the server 115 could utilize short message service (SMS) messaging, email, or the like to send the link. Alternatively or additionally, the link could be sent via a proprietary application on a device 105. Following the block 455, the process 400 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer comprising a processor and a memory, the memory storing instructions executable by the processor such that the computer is programmed to:
receive first speech data from a first user via a first device and second speech data from a second user via a second device;
obtain a first location of the first device associated with receiving the first speech data and a second location of the second device associated with receiving the second speech data;

determine that the first and second speech data are from a same dialog occurring in real time between the first user and the second user based at least on determining that the first location and the second location indicate that the first device and the second device are within a predetermined threshold distance;

receive first audio data from the first user via the first device and second audio data from the second user via the second user device over a time window beginning based on the determining that the first and second speech data are from the same dialog;

stitch the first and second audio data together to generate a stitched audio file; and generate a link based on the dialog by analyzing the stitched audio file, the link comprising a set of digital data that specifies an association between first user and the second user.

2. The system of claim 1, wherein the first and second devices are included in a plurality of three or more devices, the instructions further including instructions to identify the first and second devices as included in the plurality of devices.

3. The system of claim 1, the instructions further comprising instructions to determine whether each of the first and second devices are authenticated to provide speech data.

4. The system of claim 1, the instructions to determine that the first and second speech data are from the same dialog including instructions to compare a time and a location of the first speech data and a time and a location of the second speech data.

5. The system of claim 1, the instructions to determine that the first and second speech data are from the same dialog including instructions to identify a stored keyword in each of the first speech data and the second speech data.

6. The system of claim 1, the instructions including instructions to generate the link based on, in addition to the dialog, a biometric datum stored by the first user device or the second user device during the dialog.

7. The system of claim 1, the instructions including instructions to generate the link based on, in addition to the dialog, a prior link accessed by the first user device or the second user device after a specified amount of time has passed from generation of the prior link.

8. The system of claim 1, the instructions including instructions to send the link to the first user device or the second user device.

9. The system of claim 1, the instructions further comprising instructions to determine a correlation index that measures a quality of conversation between the first and second speech data; wherein the instructions to generate the link based on the dialog include instructions to generate the link based on the correlation index.

10. A method, comprising:

receiving first speech data from a first user via a first device and second speech data from a second user via a second device;

obtaining a first location of the first device associated with receiving the first speech data and a second location of the second device associated with receiving the second speech data;

determining that the first and second speech data are from a same dialog occurring in real time between the first user and the second user based at least on determining that the first location and the second location indicate that the first device and the second device are within a predetermined threshold distance;

receiving first audio data from the first user via the first device and second audio data from the second user via the second user device over a time window beginning based on the determining that the first and second speech data are from the same dialog;

stitching the first and second audio data together to generate a stitched audio file; and generating a link based on the dialog by analyzing the stitched audio file, the link comprising a set of digital data that specifies an association between first user and the second user.

11. The system of claim 1, the instructions further comprising instructions to:

trigger an end of the time window based on at least one of:

determining that a predetermined amount of time elapsed since beginning the time window; or determining that the first device and the second device have separated by at least the predetermined threshold distance.

12. The method of claim 10, wherein determining that the first and second speech data are from the same dialog includes identifying a stored keyword in each of the first speech data and the second speech data.

13. The method of claim 10, wherein the first and second devices are included in a plurality of three or more devices, the method further comprising identifying the first and second devices as included in the plurality of devices.

14. The method of claim 10, further comprising determining whether each of the first and second devices are authenticated to provide speech data.

15. The method of claim 10, wherein determining that the first and second speech data are from the same dialog includes comparing a time and a location of the first speech data and a time and a location of the second speech data.

16. The method of claim 10, further comprising generating the link based on, in addition to the dialog, a biometric datum stored by the first user device or the second user device during the dialog.

17. The method of claim 10, further comprising generating the link based on, in addition to the dialog, a prior link accessed by the first user device or the second user device after a specified amount of time has passed from generation of the prior link.

18. The method of claim 10, further comprising sending the link to the first user device or the second user device.

19. The method of claim 10, further comprising determining a correlation index that measures a quality of conversation between the first and second speech data; wherein generating the link based on the dialog includes generating the link based on the correlation index.

* * * * *